(12) United States Patent
Williams

(10) Patent No.: US 6,409,203 B1
(45) Date of Patent: Jun. 25, 2002

(54) SECURING DEVICE FOR RECEIVER HITCHES

(75) Inventor: Marty Williams, Colorado Springs, CO (US)

(73) Assignee: Let's Go Aero, Inc, Colorado Springs, CO (US)

(*) Notice: Subject to any disclaimer, the term of this patent is extended or adjusted under 35 U.S.C. 154(b) by 0 days.

(21) Appl. No.: 09/705,622

(22) Filed: Nov. 3, 2000

Related U.S. Application Data

(63) Continuation-in-part of application No. 09/670,060, filed on Sep. 25, 2000.

(51) Int. Cl.[7] ............................................. B60D 1/28
(52) U.S. Cl. .................... 280/506; 280/507; 403/379.3; 224/521
(58) Field of Search ................ 280/506, 504, 280/491.5, 507, 491.1, 515; 403/362, 377, 378, 379.3, 373, 374.3, 374.1, 110, 109.1, 109.6; 414/462; 224/521, 519, 511, 506

(56) References Cited

U.S. PATENT DOCUMENTS

| | | | | |
|---|---|---|---|---|
| 5,181,822 A | * | 1/1993 | Allsop et al. | 224/521 X |
| 5,333,888 A | * | 8/1994 | Ball | 280/504 |
| 5,344,175 A | * | 9/1994 | Speer | 280/491.5 X |
| 5,423,566 A | * | 6/1995 | Warrington et al. | 280/491.5 X |
| 5,593,172 A | * | 1/1997 | Breslin | 280/506 |
| 5,615,904 A | * | 4/1997 | Van Dusen et al. | 280/506 |
| 5,735,539 A | * | 4/1998 | Kravitz | 280/506 |
| 5,879,102 A | * | 3/1999 | Koliopoulos | 403/110 |
| 5,988,667 A | * | 11/1999 | Young | 280/506 |
| 6,010,049 A | * | 1/2000 | Stein | 224/521 |
| 6,010,143 A | * | 1/2000 | Stein | 280/506 |
| 6,010,144 A | * | 1/2000 | Breslin | 280/506 |
| 6,105,989 A | * | 9/2000 | Linger | 280/506 |
| 6,186,531 B1 | * | 2/2001 | Parent | 280/504 X |

* cited by examiner

Primary Examiner—J. J. Swann
Assistant Examiner—F. Zeender
(74) Attorney, Agent, or Firm—Webb & Louis LLC; Glenn L. Webb

(57) ABSTRACT

A nut is inserted within a slot formed in the sidewall of a shank member. A hitch pin including a threaded portion for engaging the nut is inserted through the side holes of the receiver tube and the shank member until the threaded portion of the hitch pin engages the nut mounted within the shank member. The hitch pin is then rotated relative to the nut to clamp the shank member against the receiver tube. A lock or clip can be attached to the end of the hitch pin to prevent accidental or unauthorized removal of the hitch pin from the receiver assembly. A bushing can also be used over the reduced diameter portion of the hitch pin after it engages the nut.

3 Claims, 3 Drawing Sheets

SECURING DEVICE FOR RECEIVER HITCHES

RELATED APPLICATIONS

This application is a continuation-in-Part of Ser. No. 09/670,060, filed on Sep. 25, 2000.

FIELD OF THE INVENTION

This invention relates to the field of securing devices for receiver hitch assemblies and particularly to the field of securing devices that minimize the relative movement between the receiver and shanks of such assemblies.

BACKGROUND OF THE INVENTION

Many vehicles today are equipped with receiver-type trailer hitches. These types of trailer hitches typically are a square tube, normally 1½ or 2 inches internal height and width, attached to the undercarriage of the vehicle. A second tube acts as a shank and includes outer dimensions slightly smaller than the internal dimensions of the receiver tube is slidable within the receiver tube. The shank member is connected to the receiver tube by a pin inserted through the two tubes and locked or clipped to prevent relative movement between the two tubes.

In another embodiment of the receiver-type trailer hitches, the shank is a solid, substantially square, bar, usually about 1½ inches square with rounded corners. The solid shank is used more often with Class I type hitch mounts.

The shank member may include a standard ball-mount for engaging with the hitch of a trailer or other wheeled vehicle. Another popular use for receiver hitches is the use as a coupling device for installing equipment racks onto the vehicle. Bicycle carrier racks, ski carriers, storage boxes and other types of carriers have been designed to use the above-described second tube to engage within a receiver hitch tube. This provides a universal system that allows a vehicle user to be able to use various trailers and carriers with a single coupling system.

A particular problem with the use of these receiver coupling systems is the clearance between the internal dimensions of the receiver tube and the external dimensions of the shank member. These tubes by necessity must have sufficient clearance to be able to be easily telescoped together. However, this clearance between the two tubes causes relative movement between the two tubes. The shank member tends to rattle or chatter within the receiver tube. This rattle or chatter is at best an annoyance and at worst can distract the driver or cause damage to the trailer or the carrier.

There have been a number of attempts to solve this problem in the past. These attempts all required the use of specially designed receivers, shanks, or accessories in order to reduce the rattle between the receiver and shank. Examples of these prior attempts are disclosed in U.S. Pat. No. 5,423,566; U.S. Pat. No. 5,593,172; U.S. Pat. No. 5,735,539; U.S. Pat. No. 5,879,102; U.S. Pat. No. 5,988,667; U.S. Pat. No. 6,010,049; U.S. Pat. No. 6,010,143; U.S. Pat. No. 6,010,144; and U.S. Pat. No. 6,105,989. These prior devices either require specially designed receivers and shanks or use extraneous mounting devices to minimize the rattle between the receiver and the shank.

There presently is a need for a device that will minimize the rattle between the receiver tube and the shank member. There is a further need for a device that can be used with most of the existing receiver systems presently in use.

SUMMARY OF THE INVENTION

The present invention solves these and other problems by providing a device for securely clamping a shank member to a receiver tube. This securing device minimizes the rattling and relative movement of the shank member and the receiver tube due to the clearance between the shank member and the receiver tube.

The present invention, in a preferred embodiment, solves these problems by providing the securing device for use not only in original equipment installations but also for use as an "after market" device that can be installed by a user in most receiver assemblies.

The present invention allows users to install the securing device of the preferred embodiments without the need for special tools or modification of the receiver assemblies.

In a preferred embodiment of the present invention, the securing device includes a spring nut assembly. The spring nut assembly is inserted within the internal cavity of the shank member until the nut is aligned with opposing side holes in the side walls of the shank member. The spring maintains the nut in alignment with the opposing side walls.

The securing device also includes a hitch pin assembly as well. The hitch pin includes a threaded portion that engages the spring nut assembly. The shank member is inserted into the receiver tube until the opposing side holes of the shank member are aligned with opposing side holes in the receiver tube. The hitch pin is then inserted through the side holes of the receiver tube and the shank member until the threaded portion of the hitch pin engages the nut mounted within the shank member. The hitch pin is then rotated relative to the nut to clamp the shank member against the receiver tube.

A lock or clip can be attached to the end of the hitch pin to prevent accidental or unauthorized removal of the hitch pin from the receiver assembly. A bushing can also be used over the reduced diameter portion of the hitch pin after it engages the nut.

Other embodiments of the present invention include using an elastomer in place of the spring on the spring nut assembly. Also, the nut may be held in alignment with the opposing side holes by adhesives, welding or other fastening techniques. One of the side holes may also be threaded instead of using a nut.

In another preferred embodiment of the present invention, the shank includes a substantially rectangular slot formed in one side of the shank opposite a side hole. A nut is recessed within the slot instead of the spring nut discussed above. The hitch pin includes a threaded portion near the distal end of the hitch pin. The hitch pin is inserted through the receiver and shank member until the threaded portion of the hitch pin engages the nut mounted in the slot. The slot prevents the nut from turning when the hitch pin is rotated. The hitch pin is rotated until the shank is drawn up tight against the receiver. This embodiment is particularly useful for solid shanks that are not usable with the spring nut assemblies discussed above.

These and other features will be evident from the ensuing detailed descriptions of preferred embodiment and from the drawings.

DETAILED DESCRIPTION OF PREFERRED EMBODIMENTS

A preferred embodiment of the present invention is illustrated in FIGS. 1–5. It is to be expressly understood that the descriptive embodiment is provided herein for explanatory purposes only and is not meant to unduly limit the claimed inventions. The preferred embodiment of the present invention is intended for use with receiver hitch systems including trailer mounts as well as carriers. The preferred embodiment may be used for original equipment installations and as an after market item.

Figure 1:
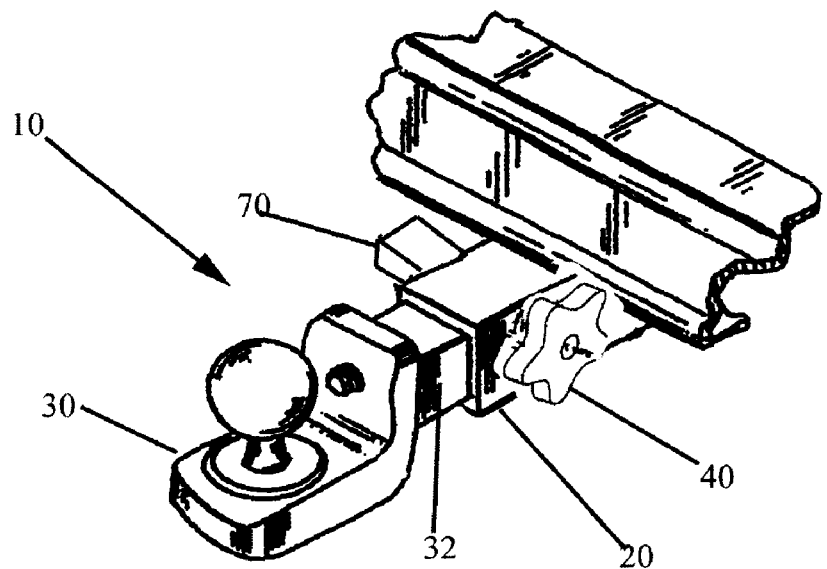
FIG. 1 shows a perspective view of a preferred embodiment of the present invention.

In the preferred embodiment, shown in FIG. 1, receiver hitch assembly 10 includes receiver tube 20 mounted beneath a bumper of a vehicle. Receiver tube 20 is mounted to the vehicle by well known mounting techniques, such as by bolting or welding. In this preferred embodiment, receiver tube 20 includes either 1½ inch square tubing or 2 inch square tubing (internal dimensions). It is to be expressly understood that other sizes or shapes of tubing can be used as well.

Figure 2:
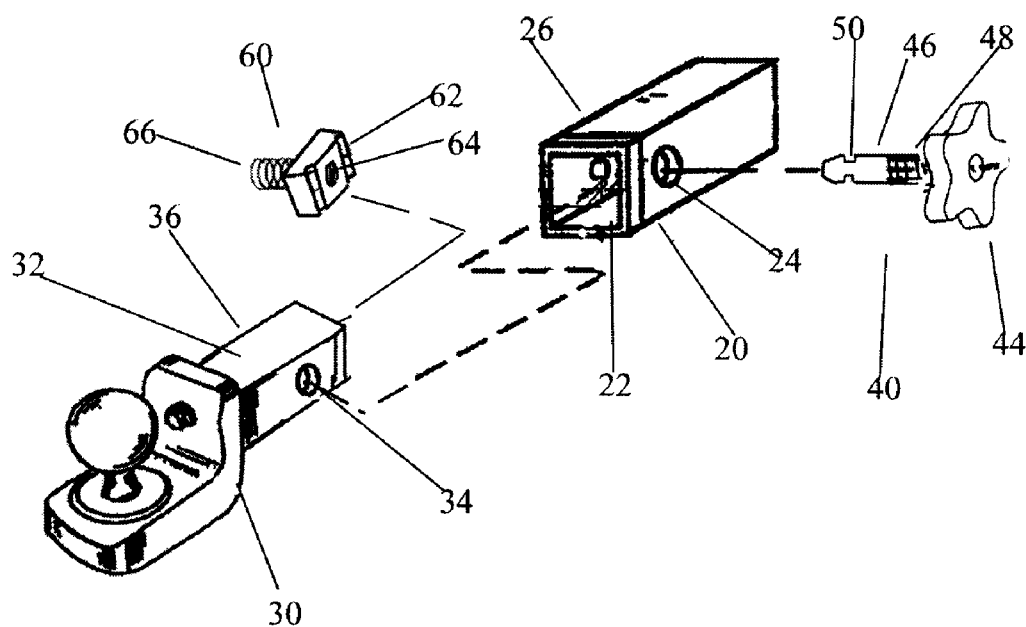
FIG. 2 shows an exploded assembly view of the embodiment of FIG. 1.
Figure 5:
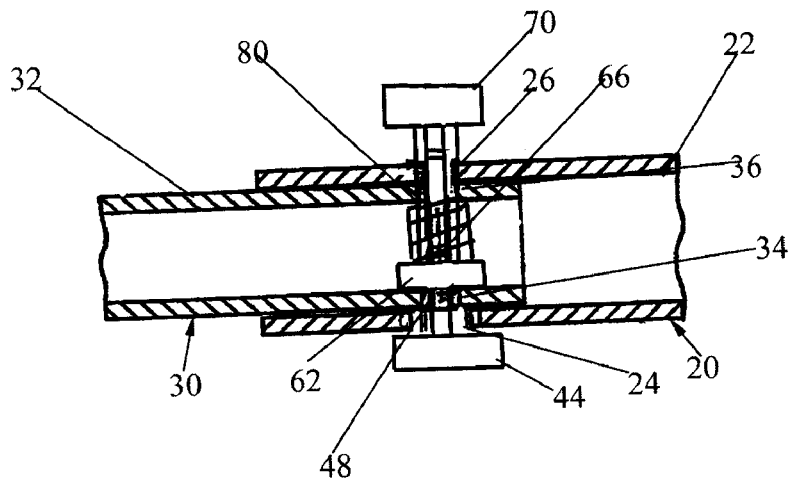
FIG. 5 shows a cross-sectional view of the assembled embodiment of FIG. 1.

Shank member 30, as shown in FIGS. 1, 2 and 5, includes a portion 32 having a shape similar to the shape of the internal portion 22 of receiver tube 20 and an external diameter slightly less than the internal diameter of the receiver tube 20. This enables the shank member 30 to be inserted within the receiver tube 20 in a telescoping manner. In most typical receiver hitch assemblies, the difference in the dimensions of the internal portion 22 of the receiver tube 22 and the external portion 32 of the shank member 30 is about 1/16 inch (one-sixteenth inch) to allow the shank member 30 to be easily inserted within the receiver tube 20. In the exemplary embodiment described herein, shank member 30 is illustrated as having a trailer hitch ball mounted thereon. It is to be expressly understood that the claimed inventions also include shank members having carriers mounted thereon, such as bicycle carriers, ski carriers, cargo compartments, platforms and other types of receiver mounted devices.

As shown in FIG. 2, receiver tube 20 includes opposing side holes 24, 26. The shank member also includes opposing side holes 34, 36 that align with the opposing side holes 24, 26 of the receiver tube 20 as the shank member 30 is inserted into the receiver tube 20. Hitch pin assembly 40 is inserted through side holes 24, 26 of the receiver tube 20 and the side holes 34, 36 of the shank member to secure the shank member 30 to the receiver tube 20.

Figure 3:
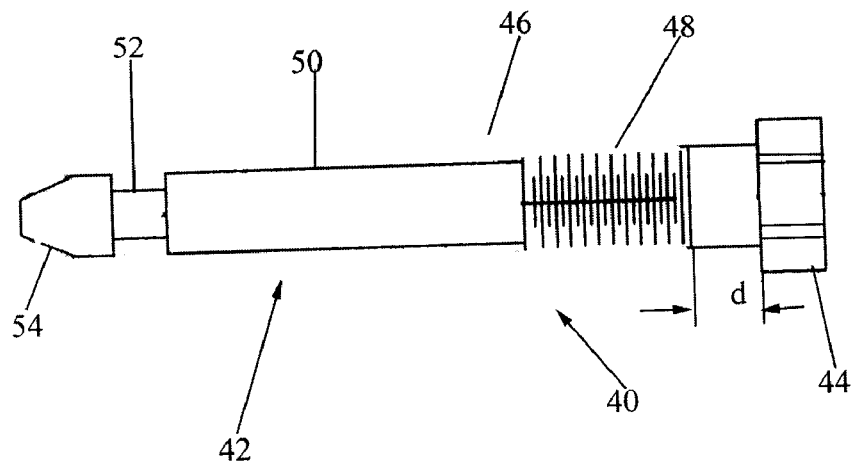
FIG. 3 shows a side view of the pin assembly of the embodiment of FIG. 1.
Figure 4:
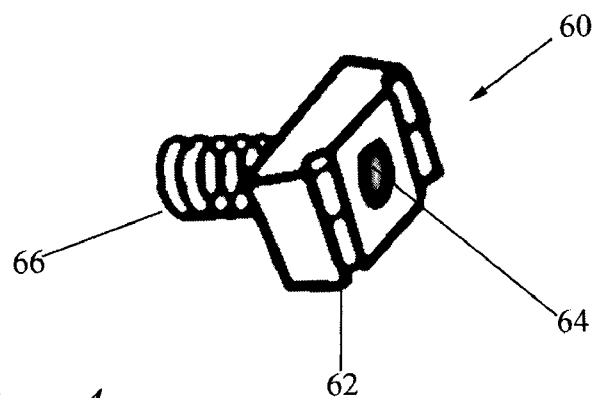
FIG. 4 shows a perspective view of the spring nut assembly of the embodiment of FIG. 1.

In a preferred embodiment, hitch pin assembly 40 includes pin 42, shown in FIG. 3. Pin 42 includes a head portion 44, an elongated portion 46, a locking groove 52 and a tapered end 54. Elongated portion 46 includes a threaded section 48 and a reduced diameter portion 50. The threaded section 48 of elongated portion 46 is spaced a distance "d" from head portion 44. This distance "d" preferably equal to or less than the combined thicknesses of the side walls of the receiver tube 20 and the shank member 30. In the preferred embodiment, head portion 44 includes a "star" wheel, but could also be a wing shape, handle shape, hex head, square head, allen head or any other shape or configuration.

Hitch pin assembly 40 also includes spring nut assembly 60. Spring nut assembly 60 includes a square nut 62 having an internal threaded portion 64 for mating engagement with threaded section 48 of pin 42. The outer dimension of the square nut 62 is selected to prevent the nut from rotating within the internal portion of the shank member 30 as discussed below. Compression spring 66 is attached to one side of nut 62. The compression spring 66 is sized so that it is in a state of compression when the spring nut assembly 60 is inserted within the shank member 30 as discussed below.

Another component of hitch pin assembly 40 is lock 70. Lock 70 engages over the tapered end 54 of pin 42 and locks onto locking groove 52.

In use, spring nut assembly 60 is inserted within the internal cavity of shank member 30. Spring 66 is compressed so that spring nut 60 is able to be easily inserted into shank member 30. The spring nut is inserted into the shank member 30 until the internal threaded portion 64 is aligned with side holes 34, 36 of the shank member. Compression spring 66 resiliently presses between the inner side wall of the shank member 30 and the nut 62 to maintain the alignment between the threaded portion 64 and the side holes 34, 36.

It is to be expressly understood that while compression spring 66 is discussed in the exemplary embodiment for descriptive purposes, other resilient mechanism can be used as well to maintain the alignment between the nut 60 and the side holes 34, 36. For example, an elastomer body could be used in lieu of the spring 66. Also, in another embodiment, nut 66 can be affixed either permanently or temporarily on the interior of the shank member by welding, by adhesive or by other known mechanisms. Also, the side hole 34 could be threaded instead of using a separate nut. In another embodiment, an alignment member, such as a detent member, notch, or other member can be incorporated in either the nut or the shank member to align the nut with the side holes.

Shank member 30 is then ready for insertion into the receiver tube 20 once the spring nut assembly 60 has been installed within the shank member 30. Shank member 30 is "telescoped" within the receiver tube 20 until the side holes 34, 36 are aligned with the side holes 24, 26 of the receiver tube. Pin 42 is then inserted into the side holes 24, 34 until the threaded portion 48 of the pin 42 engages the threaded portion 64 of the spring nut assembly 60. Pin 42 is then rotated relative to the nut 62 to tighten the nut 62 against the inner side wall of the shank member 30. The size of the nut 62 is selected to ensure that the nut cannot rotate within the shank member 30. As the pin 42 continues to be rotated relative to nut 62, nut 62 exerts pressure against the inner side wall of the shank member 30 which in turns clamps against the inner side wall of the receiver tube 20. The star wheel 44 of pin 42 or the use of a wrench allows the nut 62 to be sufficiently tightened against the side wall of the shank member 30 so that relative movement between the shank member 30 and the receiver tube 20 is minimized or even eliminated. Thus the rattling of the shank member and associated trailer or carrier mounts is minimized. Wear between the shank member and receiver tube is also minimized as well.

It is to be understood that the threaded portion on the pin 42 could be formed on the pin 42 at a location spaced closer to the opposing end 54 of the pin 42. The spring nut 62 could have a "left-handed" threaded internal portion and be reversed within the shank member 30. The rotational engagement between the threaded portion of the pin 42 and the spring nut assembly would press the nut against the inner side wall of the shank member causing the shank member 30 to be clamped against the inner side wall of the receiver tube in much the same manner as discussed above.

Lock 70 can then be secured and locked onto the end 54 of the pin assembly 40 to prevent unauthorized removal of the pin assembly 40 and the shank member 30. In another preferred embodiment, pin 42 includes a groove 72 to allow a clip pin to prevent the pin from loosening or being removed. Other types of securing mechanisms can be used as well to prevent the removal of pin 42 from the shank member 30 and receiver tube 20.

In another alternative embodiment, bushing 80 can be provided to go over the elongated portion 46 of pin 42. Bushing 80 butts up against the shoulder of threaded portion 48 of the pin to ensure that the pin 42 fits tightly within the side holes 26 of the receiver tube and 36 of the shank member. Also, the lock 70 will engage the bushing as well to ensure a tight fit between the components.

Figure 6:
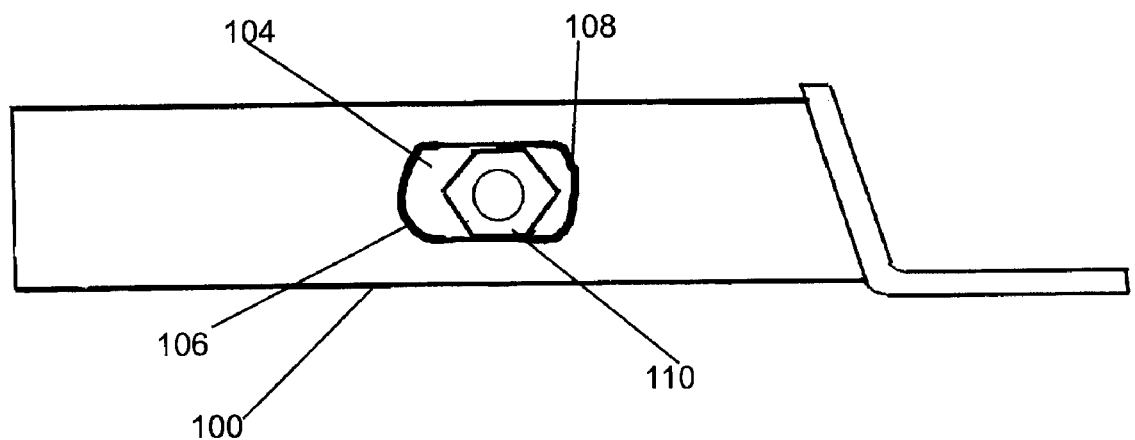
FIG. 6 shows a side view of another preferred embodiment of the present invention.
Figure 7:
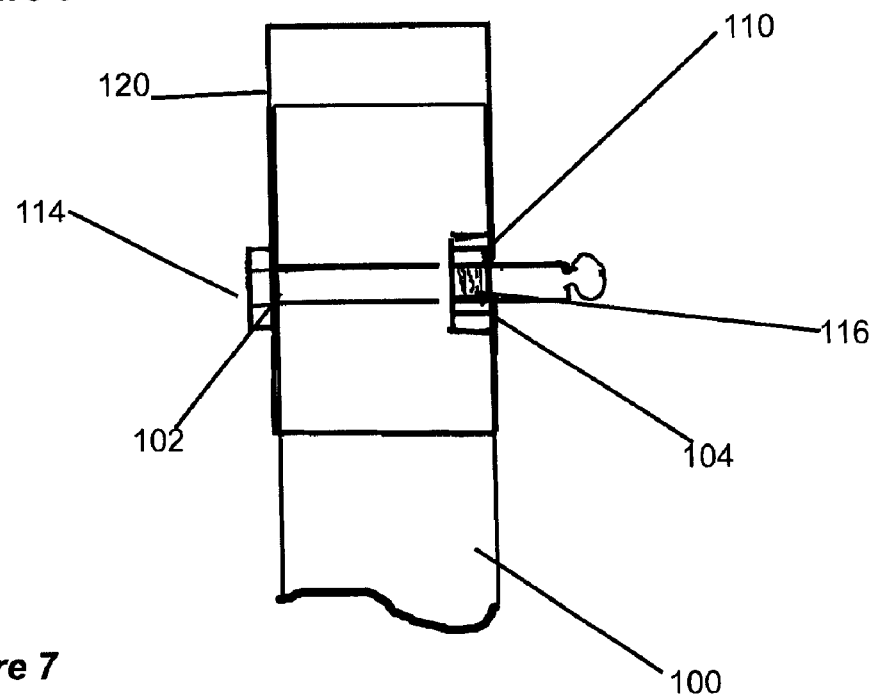
FIG. 7 shows a cross-sectional view of the embodiment of FIG. 6.

Another alternative embodiment of the present invention is illustrated in FIGS. 6 and 7. The shank member 100 in this particular embodiment may be formed of a solid bar, rather than the hollow tube discussed in the above embodiments. Shank 100 includes a side hole 102 and an elongated slot 104 having rounded corners 106, 108. It is to be expressly understood that other shapes other than an elongated slot with rounded corners can be used as well. Nut 110 is recessed within slot 104 so to be flush with the outer surface of shank 100. In use, nut 100 is mounted within slot 104. The shank 100 is inserted in the receiver 120, as shown in FIG. 7. Hitch pin 114 having a threaded portion 116 near its distal end is inserted through the side holes of the receiver 120 until the threaded portion 116 engages the nut 110. The hitch pin 114 is then rotated to draw the shank against the inner surface of the receiver. The upper and lower surfaces of the slot 104 prevent the nut 110 from rotating with the hitch pin.

It is to be expressly understood that these exemplary embodiments are provided for descriptive purposes only and not meant to unduly limit the scope of the claimed inventions. Other embodiments are also considered to be within the scope of the present inventions.

What is claimed is:

1. A method for securing a shank member to a receiver tube to minimize relative motion between the shank member and receiver tube, said method comprising the steps of:

provding an elongated pin;

providing a threaded portion on said elongated pin;

providing a nut having a threaded portion for engagement with said threaded portion of said elongated pin;

providing a slot in said shank for receiving said nut recessed within the outer surface of said shank member;

aligning said nut in said slot within the shank member with opposing side holes formed in the shank member;

inserting the shank member within the receiver tube until the opposing side holes of the shank member are aligned with opposing side holes of the receiver tube;

inserting said elongated pin through the opposing side holes formed in the receiver tube and through the opposing side holes formed in the shank member; and engaging said threaded portion of said elongated pin with said threaded portion of said nut until the side wall of said shank member is firmly engaged by the inner side wall of said receiver tube.

2. The method of claim 1 wherein said step of aligning said nut within the shank member includes:

maintaining the alignment of said nut within the shank member.

3. The method of claim 1 wherein said method further comprises:

providing a locking member to prevent unauthorized removal of said pin from the shank member and the receiver tube.

\* \* \* \* \*